United States Patent
Backmann

(10) Patent No.: US 8,212,574 B2
(45) Date of Patent: Jul. 3, 2012

(54) FILM THICKNESS SENSOR HAVING A POROUS BLOWER

(75) Inventor: Martin Backmann, Langerich (DE)

(73) Assignee: Windmoeller & Hoelscher KG (DE)

( * ) Notice: Subject to any disclaimer, the term of this patent is extended or adjusted under 35 U.S.C. 154(b) by 762 days.

(21) Appl. No.: 12/084,251

(22) PCT Filed: Oct. 24, 2006

(86) PCT No.: PCT/EP2006/010230
§ 371 (c)(1),
(2), (4) Date: Apr. 28, 2008

(87) PCT Pub. No.: WO2007/048571
PCT Pub. Date: May 3, 2007

(65) Prior Publication Data
US 2009/0136655 A1    May 28, 2009

(30) Foreign Application Priority Data
Oct. 28, 2005  (DE) .......................... 10 2005 051 675

(51) Int. Cl.
*G01R 27/26* (2006.01)
*G01B 13/04* (2006.01)

(52) U.S. Cl. ........................................ 324/671; 73/37.6

(58) Field of Classification Search .................. 324/229, 324/663, 671; 73/37.5, 37.6
See application file for complete search history.

(56) References Cited

U.S. PATENT DOCUMENTS

| 3,528,002 | A | | 9/1970 | Dunlavey |
| 4,433,571 | A | | 2/1984 | Snow, Jr. |
| 4,896,782 | A | | 1/1990 | Hawkins et al. |
| 5,742,167 | A | * | 4/1998 | Haynes ......................... 324/671 |
| 6,029,502 | A | | 2/2000 | Stuker |
| 6,318,153 | B1 | * | 11/2001 | Dumberger et al. ........... 73/37.6 |
| 6,541,986 | B2 | | 4/2003 | Stein et al. |
| 6,605,950 | B2 | | 8/2003 | Stein |
| 7,369,255 | B2 | | 5/2008 | Konermann et al. |
| 7,690,243 | B2 | * | 4/2010 | Fischer ......................... 73/37.5 |
| 2010/0256951 | A1 | * | 10/2010 | Konermann et al. ......... 702/170 |

FOREIGN PATENT DOCUMENTS

| DE | 40 02 982 A1 | 8/1990 |
| DE | 40 02 155 A1 | 7/1991 |
| DE | 195 11 939 A1 | 10/1996 |
| DE | 196 32 385 A1 | 3/1997 |
| DE | 102 42 175 A1 | 3/2004 |
| DE | 10 2004 039 652 A1 | 2/2006 |
| DE | 10 2005 038 731 A1 | 2/2007 |
| EP | 0 591 239 | 4/1994 |
| EP | 0 801 290 A2 | 10/1997 |
| EP | 0 943 413 A2 | 9/1999 |
| EP | 1 182 423 A1 | 2/2002 |

(Continued)

*Primary Examiner* — John Fitzgerald
(74) *Attorney, Agent, or Firm* — Jacobson Holman PLLC

(57) ABSTRACT

A sensor system for measuring the thickness of flat material that is moved relative to the sensor system has a first sensor device for measuring the thickness of the flat material and a device for generating an air cushion. The device is disposed in such a way that there is an air cushion between at least one side of the sensor device that faces the flat material, and the flat material, during operation. In the region of the air cushion, the first sensor device includes surface sections having porous material and/or material that is provided with microholes.

10 Claims, 2 Drawing Sheets

FOREIGN PATENT DOCUMENTS

| | | |
|---|---|---|
| EP | 1 191 305 A1 | 3/2002 |
| EP | 1 193 041 A2 | 4/2002 |
| EP | 1 681 531 A1 | 7/2006 |
| WO | WO 92/20989 | 11/1992 |
| WO | WO 2006/015575 A1 | 2/2006 |
| WO | WO 2007/019969 A1 | 2/2007 |

* cited by examiner

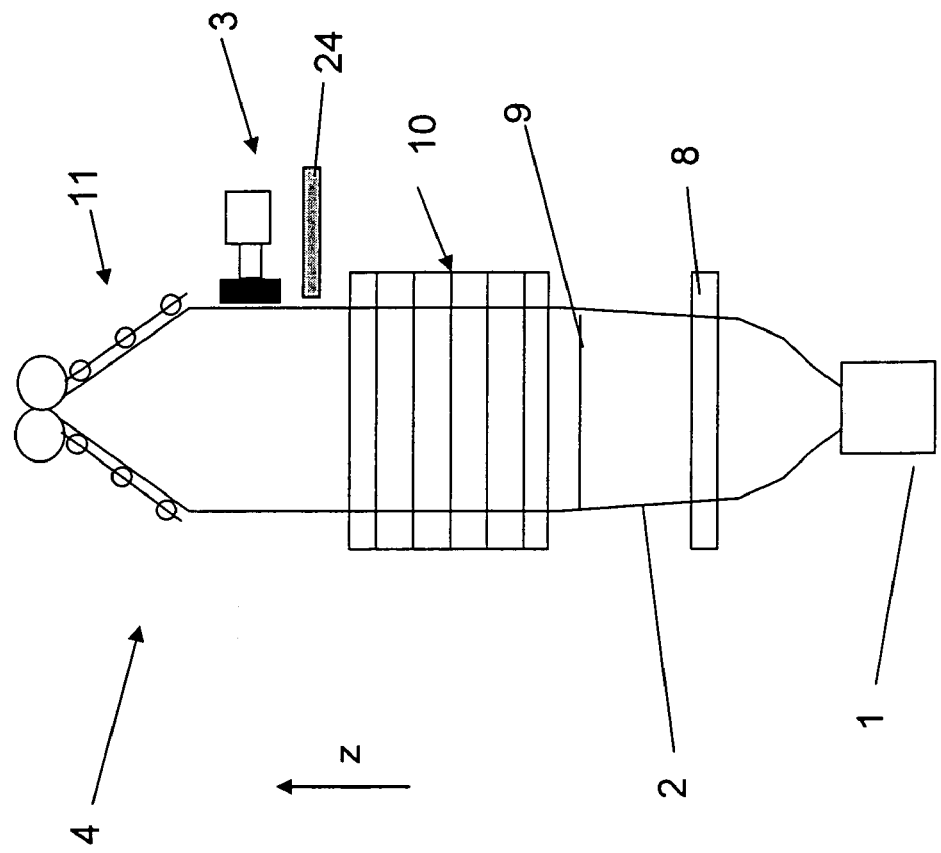
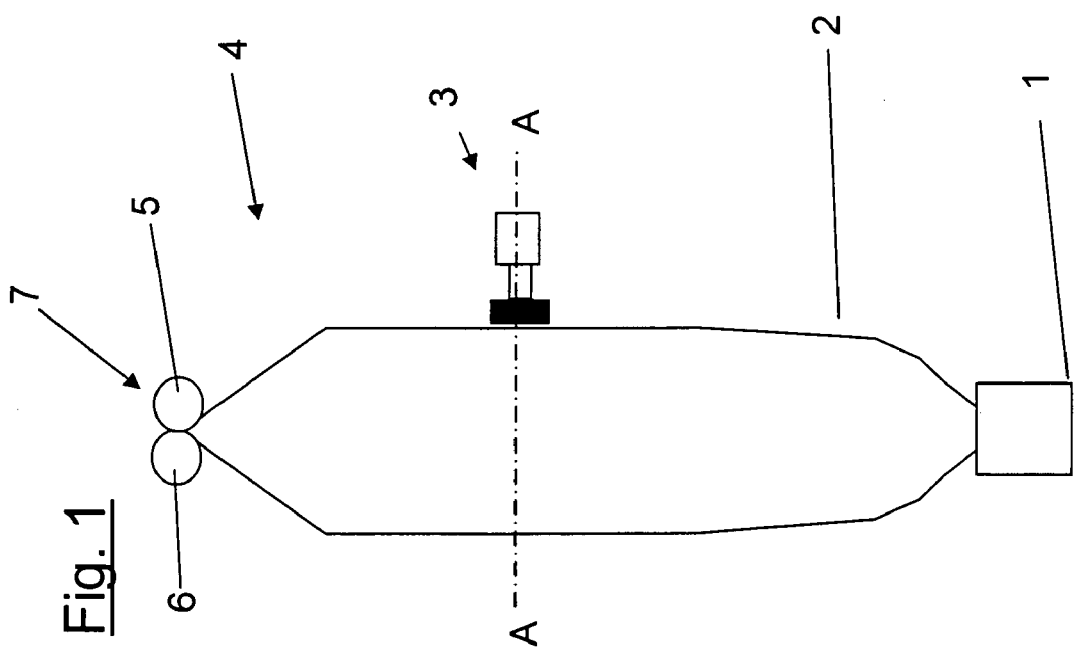

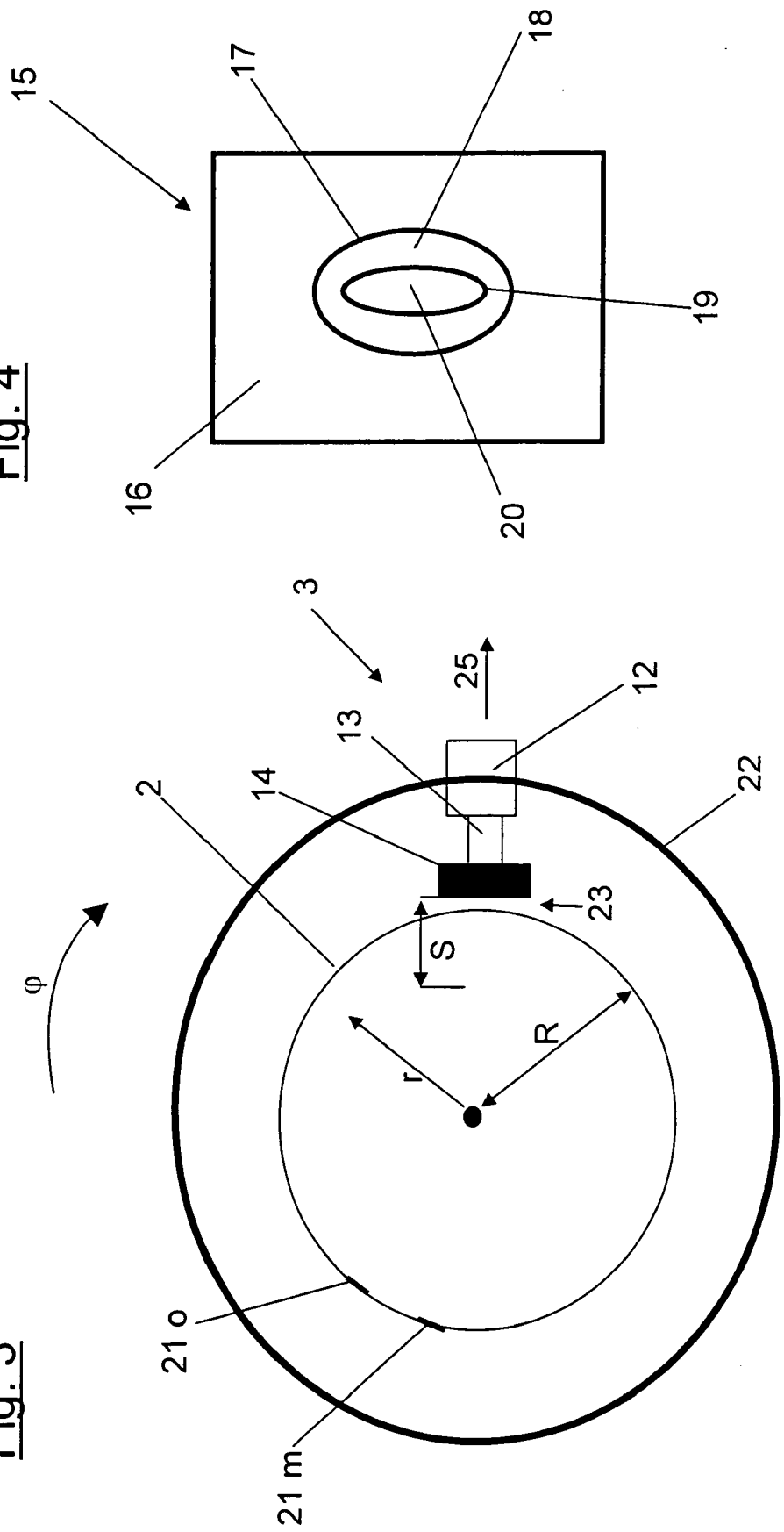

FILM THICKNESS SENSOR HAVING A POROUS BLOWER

CROSS-REFERENCE TO RELATED APPLICATION

This is a national stage of PCT/EP2006/010230 filed Oct. 24, 2006 and published in German.

BACKGROUND OF THE INVENTION

1. Field of Invention

The invention relates to a sensor system for measuring the thickness of flat material, which is moved relative to the sensor system a blown film line for manufacturing film which blown film line comprises such a sensor system, and a method for operating a blown film line comprising such a sensor system.

2. Description of the Prior Art

Sensor systems for measuring the thickness of flat material, which is moved relative to the sensor system, have been disclosed in the prior art. They are preferably used for measuring the thickness of freshly extruded film. The measured values serve for regulating the film thickness. Therefore, in this context, the term "flat material" is meant to connote predominantly film-shaped or web-shaped material, which is mostly guided past the sensor system comprising a sensor device such as a sensor head.

The measuring methods used for measuring the film thickness include optical, radiometric, inductive, and capacitive measuring techniques. However, especially when producing sensitive or sticky films, sensor systems that come into contact with the film cause damages on the latter. EP 591 239 B1 therefore suggests distancing a sensor device from the film by means of an air cushion.

The sensor device, which is disclosed in EP 591 239 B1 and is distanced from the film in such a manner, is a capacitive sensor, the two electrodes of which are mounted on a sensor head on one side of the film. Both electrodes comprise active surfaces that are facing the film. An electric field, which penetrates the air cushion between the sensor device and the film, the film itself, and the space that is located behind the film and is likewise filled with air here, is also formed between these active surfaces of the two electrodes. Here, there is known to be a dependence of the capacitance of the capacitor on the material-specific dielectric constant $\in_r$ of the materials (air and film material) penetrated by the electric field. A change in the thickness of the film material thus changes the capacitance of the capacitor. However, it has been seen that variations in the distance between the film and the active surfaces of the electrodes also change the capacitance of the capacitor. This influence of the distance of the film—or any flat material—also exists in the other measuring principles mentioned above such as the inductive measuring principle.

However, in blown film lines, in particular, this distance changes constantly since the film flutters, which can also result in the sensor device coming into contact with the film.

DE 195 11 939 A1 therefore suggests constantly measuring the distance between the sensor device and the film, regulating the position of the sensor device based on these measured values, and constantly adapting to the fluttering movement of the film by moving the sensor device in the radial direction of the film bubble. However, it is additionally necessary here to draw in the film using low-pressure nozzles in the boundary areas of the sensor device and thus to restrict the fluttering of the film relative to the sensor device.

Another approach for the same problem is the object of EP 801 290 B1. It is likewise suggested here to regulate the distance between the sensor and the film permanently, the measurement signal for regulating said distance being acquired by measuring the stagnation pressure between the film and the sensor device. Since the movement of the sensor device is more inertial than that of the fluttering film, it is further suggested to reduce the errors resulting in thickness measurement from variations in the distance, as follows: The actual distance between the sensor and the film at the time of thickness measurement is measured. The (erroneous) measured value of thickness is corrected based on the measured value of distance with the help of an error function.

Another possibility consists in measuring the film thickness only when the correct distance between the sensor and the film has just passed through. However, this results in irregular time intervals between the measurements.

It is clear from this explanation that the measuring devices described above are complicated, expensive, and yet error-prone.

It is therefore the object of the present invention to redress these disadvantages.

SUMMARY OF THE INVENTION

This object is achieved by the characterizing features of the invention as described herein. The present invention utilizes the fact that air cushions have proved to be substantially more stable in experiments performed on porous material or material that is provided with micro-holes than on other materials.

The variations in the distance between the sensor and the film thus play a smaller role. The sensor can therefore be positioned more closely against the film. It is possible to further reduce the fluttering of the film if that side of the sensor device that faces the film or any flat material, in general, is pressed against the flat material properly. Usually, this material will then apply a counterforce, which counteracts the stable air cushion of the invention. As a result, a state of equilibrium can then be formed, which limits the fluttering of the film. Depending on the application, said counterforce can also often be applied at least partly by objects or physical variables other than the flat material. In the case of a blown film line, the internal pressure of the film bubble plays a decisive role here.

In this application, it is advantageous to press into the film bubble with that surface of the sensor device that faces the film bubble over a longer period of time—perhaps during the entire job. Here, the air cushion of a sensor device, which performs the measurement from outside the film bubble, is located in the radial direction of the film bubble within the nominal radius of the same. The same often applies to that side of the sensor device that faces the film and even to parts of the sensor device itself.

The cross-section of the film bubble can get considerably deformed at the measuring point. Usually, such sensors travel around the film bubble in the circumferential direction of the same in order to measure the thickness profile of the bubble along the circumference. The penetration depth of the air cushion into the nominal radius of the bubble can advantageously range from 1 to 5 centimeters. It can also range from 5 to 15 centimeters. The interesting feature in this development of the invention is that the penetration depth does not come about as a result of a position control process of the sensor device, in which the sensor device attempts to follow the fluttering film and temporarily assumes such a position.

Rather, the pressure originating from the air cushion, for its part, influences the position and the fluttering behavior of the film.

In a particularly advantageous development of the invention, it is therefore possible to dispense with the entire effort involved in the position measurement of the film, the constant rapid corrections in the position of the sensor device, and other measures that have been suggested in EP 801 290 B1 and DE 195 11 939 A1 in order to prevent the consequences of the fluttering of the film.

Just when the sensor device assumes such a prominent position in relation to the flat material and optionally exerts pressure on the flat material, it is advantageous to detect when and whether defective points of the flat material approach the sensor device due to the mutual relative movement. Otherwise the sensor device could create a hole at such a defective point or enlarge any such hole and reach into the material. The movement of the material relative to the sensor device then results in serious damage to the flat material and/or the sensor device.

It is therefore advantageous, if appropriate, to detect such damages and to withdraw the sensor device from the material.

The application of the teaching of the invention to sensor devices, which comprise inductive or capacitive measuring means, appears to be particularly advantageous since the influence of the variations in the distance between the sensor and the film on the measurement results is particularly significant in these measuring methods. The shape of the electrodes in capacitive measuring devices, which have both electrodes on one side of the flat material, is shown in the three documents cited above. Usually, the electrodes mutually encompass each other and their active surfaces are located on that surface of the sensor device that faces the flat material. The electrodes on this surface of the sensor device are often two concentric circles or two ellipses or they have the shape of meandering segments, which are entangled in each other.

Sensor devices of the invention, which are used in blown film lines, can be used at those locations of these lines in which it was hitherto impossible to use these sensors. Until now, such sensors are disposed in the conveying direction of the film between the calibration basket and the flatness unit. The fluttering of the film is relatively low at this location; the film tube still has a round cross-section and is already crystallized considerably.

One disadvantage of measuring the film thickness at this location is the considerable distance from the blown film die or cooling ring at which deviations arise in the film thickness and can also be regulated by the blowing of air or heating of the melt. It is possible using the measuring system of the invention to measure the film thickness, for example, between the die gap of the blown film die and the calibration basket, if such a die gap exists. The measuring system of the invention can therefore be advantageously combined with a device disclosed in the still unpublished German patent application having the file number 10 2005 038 731.4. This document describes the manner in which the fluttering behavior of the just extruded film can be restricted directly after the extrusion of the film. The use of porous materials among other things is also suggested for this purpose. The "clamping" of the film between two air cushions is also suggested. All measures suggested in the document cited above and the features of the device for guiding the film or for restricting its fluttering behavior are regarded as part of the present document. Recourse to the disclosure of the afore-mentioned document within the scope of the present patent application is permissible.

Another disadvantage of arranging the sensor device in the conventional manner is the high device-related expenditure resulting from separately suspending the sensor device (often at a height of several meters) and guiding the sensor device along the circumference of the film bubble. It seems possible to combine the sensor device with the calibration basket. This is particularly advantageous in sensor devices of the invention due to the afore-mentioned properties of the characteristic air cushion.

Several sensors can also be mounted along the circumference of the bubble, thereby sparing the sensor system the movement along the circumference of the film bubble.

Sensor devices can also be mounted on the flatness unit. If the film tube is actually flattened before it reaches the sensor, a sensor is usually only able to jointly measure the thickness of those two circumferential sections of the film tube that are located on top of each other. However, this problem can also be addressed by means of specific calculation methods or a visual detection of the position of the boundary layer between the two layers.

Additional exemplary embodiments of the invention are defined in the description of the subject-matter and claims.

BRIEF DESCRIPTION OF THE DRAWINGS

In the individual figures:
FIG. 1 is a sketch of a first blown film extrusion line
FIG. 2 is a sketch of a second blown film extrusion line
FIG. 2 is a sketch of a first blown film extrusion line
FIG. 3 shows a section taken along line A-A marked in FIG. 1 with additional features of a sensor system extending around the circumference of a film bubble
FIG. 4 is a plan view of that side of a capacitive sensor device that faces the flat material

DETAILED DESRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 shows a first blown film extrusion line 4, in which a film bubble 2 or a film tube is extruded by a blown film die 1 in the direction of the arrow z. The film bubble 2 is squeezed off by the squeezing device 7 comprising nip rolls 5 and 6. The thickness measuring system 3 occupies a typical position. Usually, such a thickness measuring system or sensor system 3 is a first sensor device or a first sensor head 14, which is guided around the circumference of the film bubble, as shown in FIG. 3.

FIG. 2 shows a second blown film extrusion line 4, which has the same features as the first blown film extrusion line. However, in the second blown film extrusion line, other partly necessary and partly optional devices are shown in order to depict their positions in an extrusion line.

The outer cooling ring 8, which blows cooling air against the film tube 2, is the first component disposed in the conveying direction z. In more modern extrusion lines, the outer cooling ring can regulate the temperature of the cooling air, which is blown against circumferential sections $21n$ of the film tube 2 in order to even out thick places. A regulation of the melt temperature in the blown film die is also tried out for this purpose.

The next additional feature of the extrusion line shown in FIG. 2 as compared to the extrusion line shown in FIG. 1 is the calibration basket 10, which contributes to determining the diameter of the film tube 2.

In FIG. 2, the sensor system 3 also comprises a second sensor device 24, whose function will be explained again later.

The flatness unit 11 is disposed before the squeezing device 7. The figure also shows the typical location of the frost region 9, in which the material existing initially as film melt is formed in an at least partly crystallized form or develops crystallites.

FIG. 3 is a sectional view of a sensor system 3 extending around the circumference of a film bubble. The purpose of most of the components illustrated is the positioning and the movement of the first sensor device 14 toward or in the vicinity of the film bubble 2. The arm 13, which is articulated to the sensor support 12 in such a way that said arm can move in the radial direction "r" of the film bubble and serves for directly holding the first sensor device 14. The sensor support 12, for its part, is displaceable together with the two aforementioned components 13, 14 along the rail 22. Usually, the sensor support is continuously driven around the film bubble in the circumferential direction [(φ) direction]. For promoting a better understanding, the circumferential sections of the film bubble 21m and 21o are shown again in FIG. 3. They symbolize that modern thickness regulating processes often break down the circumference of the film bubble into N individually adjustable circumferential sections or circumferential sectors 21n.

FIG. 3 does not show the manner in which the holding device formed of the arm 13 and the sensor support 12 positions that side 15 of the sensor head that faces the film or the air cushion 23 such that they are located within the nominal radius R of the film bubble 2. The distance S of such a possible displacement or the (exaggerated) magnitude thereof is represented using the arrow marked by the letter S. The advantages of such a displacement when using the sensor system 3 of the invention in a blown film line 4 have been discussed already. A second sensor device 24 can also be included as a part of a preferred embodiment of a sensor system of the invention. The second sensor device 24 examines the film for damages and holes, as shown in FIG. 2, in the transport direction "z" of the film before the first sensor device 14. If the second sensor device 24 detects such a hole, the first sensor device 14 is pulled away from the film by a movement of the arm 13. The actuators for this movement indicated by the arrow 25 can be mounted in the arm 13 or on the sensor support 12. This movement of the arm helps prevent damages on the film 2 and the first sensor device 14. Optical sensors or sensors, which react to electromagnetic radiation and which also often require a counterpart within the film bubble, are suitable for this purpose.

FIG. 4 shows a sketch of that side 15 of a first sensor device 14 of a capacitive sensor that is facing the film. The side 15 can be divided into the region outside the electrodes 16, the outer and the inner electrodes 17 and 19, a dielectric 18 between these electrodes 17 and 19 and often, but by no means always, an inner region 20.

Porous material or material that is provided with micro-holes can be present in each of these regions. Each of these regions can also be provided with a material of such kind that air can be pressed through it in order to generate an air cushion. Such a material is good for the stability of the air cushion even if air is not pressed through the material directly at this location but only at neighboring locations.

At least one electrode, or at least the active surface thereof, could also be made of such a material. For this purpose, a metal—preferably sintered metal—could be selected in order to position the electric field in the most favorable manner possible.

It is advantageous in general and in connection with a pressing of the sensor into the film bubble, in particular, if the sintered material is fine-grained or if the material has fine holes. In this context, a grain size or hole size of less than 100 μm is classified as fine. Grain sizes or hole sizes of less than 80 cm or even less than 50 μm are still more advantageous. In the case of such grain sizes or hole sizes, it is possible to use air having relatively high pressure for generating the air cushion, which results in a stable air cushion. A relatively high pressure is ensured at 50 or 100 milliliter to one bar of over-pressure.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

List of reference numerals

| | |
|---|---|
| 1 | Blown film die |
| 2 | Film bubble/film tube |
| 3 | Sensor system |
| 4 | Blown film line |
| 5 | Nip roll |
| 6 | Nip roll |
| 7 | Squeezing device |
| 8 | Outer cooling ring |
| 9 | Frost region |
| 10 | Calibration basket |
| 11 | Squeezing device [sic: Flatness unit] |
| 12 | Sensor support |
| 13 | Arm |
| 14 | (First) sensor device, sensor head |
| 15 | That side of the sensor device that faces the film |
| 16 | Region outside the electrodes |
| 17 | Outer electrode (active surface) |
| 18 | Dielectric between the electrodes |
| 19 | Inner electrode (active surface) |
| 20 | Inner region |
| 21n | Circumferential section |
| 22 | Rail |
| 23 | Air cushion |
| 24 | Second sensor device |
| 25 | Arrow in the direction of movement of the sensor 14 away from the film 2 |
| φ | Circumferential direction of the film bubble |
| r | Radial direction of the film bubble |
| z | Conveying or axial direction of the film bubble |
| R | Nominal radius of the film bubble |
| S | Distance by which the air cushion intervenes in the nominal radius of the bubble |

What is claimed is:

1. A sensor system for measuring a thickness of a flat material that is moved relative thereto, comprising:
   a first sensor device for measuring the thickness of the flat material;
   a device for generating an air cushion between the flat material and at least one side of the first sensor device that faces the flat material,
   the first sensor device including in a region of the air cushion, surface sections that include at least one of a porous material and a material that is provided with micro-holes; and a second sensor device for detecting damage or holes in the flat material, the second sensor device being disposed relative to the first sensor device and the flat material so as to detect the damage or holes in the flat material before the damage or holes reach the region of the air cushion due to relative movement between the flat material and the first sensor device.

2. The sensor system according to claim 1, further comprising a return motion device for changing a distance between the first sensor device and the flat material.

3. The sensor system according to claim 1, wherein the air cushion is located inside a nominal radius R of the film bubble.

4. The sensor system according to claim 1, wherein the first sensor device includes inductive measuring devices.

5. The sensor system according to claim 1, wherein
the at least one of the porous material and the material that is provided with micro-holes is disposed in at least one section of the at least one surface of the first sensor device that faces the flat material, selected from
in a region between active surfaces of the electrodes that face the flat material,
around the active surfaces of the electrodes that face the flat material, and
on the active surfaces of the electrodes that face the flat material.

6. A blown film line that includes a sensor system according to claim 1, the sensor system being configured to measure the film thickness in at least one location of the blown film line selected from
between a blown film die and a frost region of the film tube,
at a calibration basket,
between the calibration basket and a flatness unit,
at the flatness unit,
at a squeezing device, and
after the flatness unit.

7. The blown film line according to claim 6, further comprising a return motion device for changing a distance between the first sensor device and the flat material.

8. A method of operating a blown film line for producing a film with a sensor system that includes (a) a first sensor device for measuring a thickness of the film, which is configured as a blown film bubble during the measuring, (b) a device for generating an air cushion between the film and at least one side of the first sensor device that faces the film, the first sensor device including in a region of the air cushion, surface sections that include at least one of a porous material and a material that is provided with micro-holes, and (c) a second sensor device for detecting damage or holes in the film, the second sensor device being disposed relative to the first sensor device and the film so as to detect the damage or holes in the film before the damage or holes reach the region of the air cushion due to relative movement between the film and the first sensor device, said method comprising:
detecting with the second sensor device any damage or holes in the film;
generating an air cushion between the film and at least one side of the first sensor device that faces the film; and
measuring the thickness of the film from outside the film bubble with the first sensor device.

9. The method according to claim 8, wherein the side of the first sensor device that faces the film is positioned by a holding device against the film bubble during a measuring period such that the surface of the first sensor device that faces the film is positioned inside the nominal radius R of the film bubble.

10. The method according to claim 8, wherein the air cushion (i) is generated by conveying air through the porous material or the material that is provided with micro-holes and (ii) is located inside a nominal radius R of the film bubble.

* * * * *